Nov. 19, 1929.  L. D. COLLAR  1,736,253
VALVE AND VALVE STEM CONSTRUCTION FOR SELF GRINDING VALVES
Filed July 18, 1928
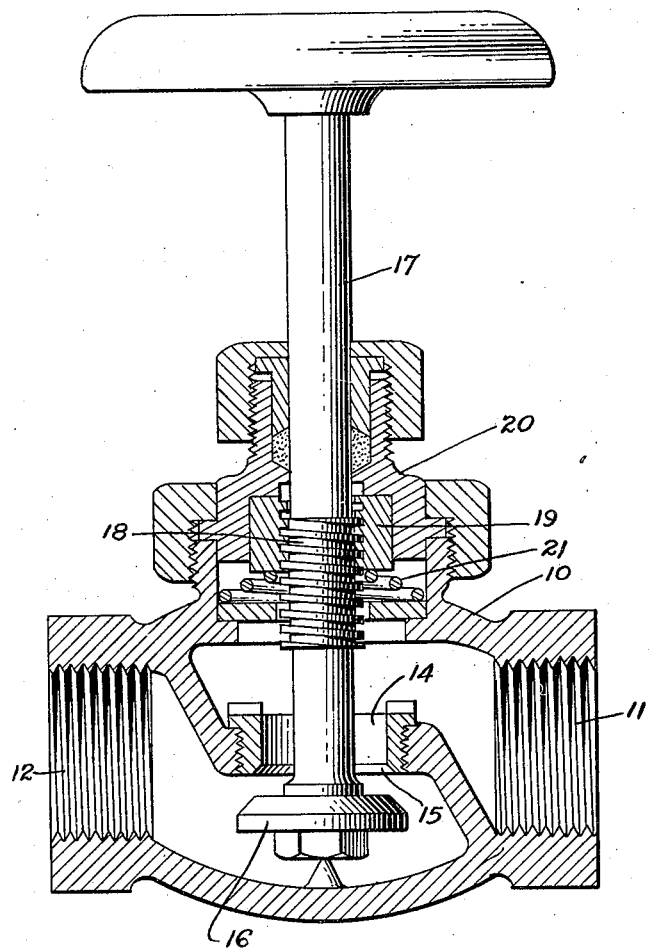
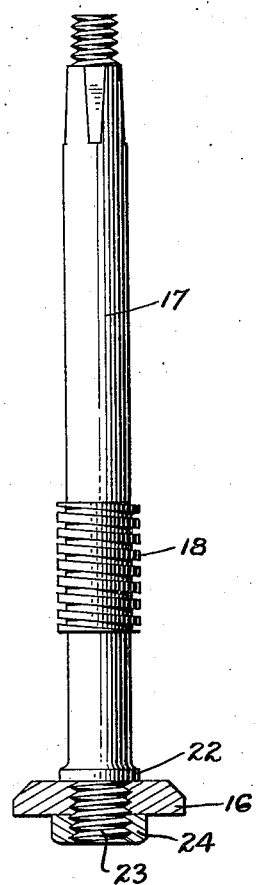
INVENTOR.
Lloyd D. Collar.
BY
Townsend, Loftus & Abbett
ATTORNEYS.

Patented Nov. 19, 1929

1,736,253

UNITED STATES PATENT OFFICE

LLOYD D. COLLAR, OF BERKELEY, CALIFORNIA, ASSIGNOR TO COLLAR VALVE CORPORATION, OF BERKELEY, CALIFORNIA, A CORPORATION OF CALIFORNIA

VALVE AND VALVE-STEM CONSTRUCTION FOR SELF-GRINDING VALVES

Application filed July 18, 1928. Serial No. 293,572.

This invention relates to valves of the so-called self-grinding type and particularly pertains to certain improvements on the valve disclosed in Letters Patent of the United States No. 1,544,219 issued to me June 30, 1925.

The type of valve disclosed in this prior patent includes a valve body having the usual inlet and outlet openings and a valve opening surrounded by a valve seat controlling the flow between the inlet and outlet openings. The valve opening is controlled by a valve which cooperates with the seat. This valve is fitted with a stem which is threaded through a stem block arranged for reciprocating movement but held from turning in a bonnet arranged on the valve body. This stem block bears against a compression spring which is interposed between the stem block and an abutment formed in the valve body. When the valve is moved to closed position the stem threads through the stem block and the latter remains stationary but when the valve abuts against the seat continued rotation of the valve stem causes axial movement of the stem block against the action of the spring, causing the valve to grind on the seat. Also, when commencing to open the valve, the stem of the latter is revolved sufficiently to move the stem block and relieve the spring before the valve commences to leave the seat. This, of course, causes a grinding action between the valve and seat prior to opening the valve.

It is the principal object of the present invention to provide an improved valve and valve stem construction which may be manufactured less expensively than hitherto and which will operate with greater efficiency than prior structures.

In carrying out this object into practice I have formed the valve stem and the valve of different materials and have assembled these elements together in a manner permitting them to be produced in quantities considerably less expensive than hitherto.

One form which the invention may assume is exemplified in the following description and illustrated by way of example in the accompanying drawings, in which:

Fig. 1 is a central vertical section through the valve.

Fig. 2 is a view in elevation and section of the valve stem and valve member constructed in accordance with my present invention.

Referring more particularly to the accompanying drawings, 10 indicates a valve body having the usual inlet and outlet openings 11 and 12, the flow between which is controlled by a valve opening 14. This valve opening 14 is formed with a valve seat 15 controlled by a valve member 16. This valve member 16 is fitted with a stem 17 having a threaded portion 18 threaded through a stem block 19. This stem block 19 is reciprocably but non-rotatably mounted in a bonnet 20 secured to the valve body 10. A spring 21 is provided and is interposed between the valve body and the stem block so that the latter may reciprocate against the action of the spring.

As the valve stem is rotated the first action is for the valve stem to move upwardly through the stem block seating the valve. When the valve is seated continued rotation of the stem will cause the stem block 19 to move downwardly against the action of the spring 21 causing the valve to grind on its seat.

In opening the valve rotation of the stem will first cause the stem block 19 to move outwardly to its outermost position abutting against the bonnet. Continued rotation of the stem then causes the valve stem to thread inwardly through the stem block and open the valve.

The construction of the stem block, bonnet and the spring is fully described and claimed in my copending applications entitled Valve, filed July 18, 1928, Ser. No. 293,570, and Bonnet construction for self-grinding valves, filed July 18, 1928, Ser. No. 293,571.

The principal feature of the present invention is the construction of the valve stem and valve which permits them to be manufactured rapidly and inexpensively so that the valve itself may be produced at a minimum of cost.

The outer end of the valve stem is threaded to receive the hand wheel. At its other end the valve stem is formed with an annularly projecting collar 22. Beyond this collar the valve stem is threaded as at 23. The valve disk 16 is tapped and is threaded onto the threaded end 23 of the valve stem against the shoulder or collar 22. A nut 24 is then threaded on the end 23 to clamp and lock the disk 16 in place.

It is obvious that by this construction both the valve stem and the valve 16 may be produced very inexpensively and very rapidly on automatic screw machines. This, of course, reduces their production cost to a minimum and enables stock materials to be used in their production.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A valve stem assembly for a valve of the character described comprising a valve stem having an intermediate threaded portion of a diameter slightly larger than the remainder of the stem, an annular collar formed on said valve stem of a diameter substantially the same as said threads, the extremity of the valve stem beyond said collar being threaded, a valve disk threaded on to said threaded end against said collar, and clamping means clamping said disk in position.

LLOYD D. COLLAR.